United States Patent [19]

McLaren et al.

[11] Patent Number: 6,064,794
[45] Date of Patent: May 16, 2000

[54] TRICK-PLAY CONTROL FOR PRE-ENCODED VIDEO

[75] Inventors: David Lionel McLaren, Mountain View; Gilles Boccon-Gibod, San Francisco, both of Calif.

[73] Assignee: Thomson Licensing S.A., Boulogne Cedex, France

[21] Appl. No.: 08/894,569

[22] PCT Filed: Mar. 8, 1996

[86] PCT No.: PCT/US96/02645

§ 371 Date: Aug. 22, 1997

§ 102(e) Date: Aug. 22, 1997

[87] PCT Pub. No.: WO96/31066

PCT Pub. Date: Oct. 3, 1996

[30] Foreign Application Priority Data

Mar. 30, 1995 [GB] United Kingdom .................. 9506493

[51] Int. Cl.[7] .................................................. H04N 5/91
[52] U.S. Cl. ........................................... 386/68; 386/111
[58] Field of Search .............................. 386/68, 111, 109, 386/33, 27, 124–125; 360/8; 369/275.3; H04N 5/91

[56] References Cited

U.S. PATENT DOCUMENTS

| | | | |
|---|---|---|---|
| 5,576,902 | 11/1996 | Lane et al. ................................. | 386/68 |
| 5,596,594 | 1/1997 | Fukushima et al. .................. | 369/275.3 |
| 5,684,917 | 11/1997 | Yanahihara et al. ...................... | 386/80 |
| 5,717,816 | 2/1998 | Boyce et al. ............................ | 386/111 |
| 5,751,893 | 5/1998 | Shimoda et al. ........................ | 386/111 |

FOREIGN PATENT DOCUMENTS

| | | |
|---|---|---|
| 0529834 | 3/1993 | European Pat. Off. . |
| 0598516 | 5/1994 | European Pat. Off. . |
| 0625857 | 11/1994 | European Pat. Off. . |
| 0398999 | 2/1996 | European Pat. Off. . |
| 9526108 | 9/1995 | WIPO . |

*Primary Examiner*—Wendy Garber
*Assistant Examiner*—Vincent F. Boccio
*Attorney, Agent, or Firm*—Joseph S. Tripoli; Joseph J. Laks; Harvey D. Fried

[57] ABSTRACT

An inventive method provides various reproduction modes by controlled selection of replay locations. Selection within a video stream or between separate video streams derived for selected trick-play speeds may be facilitated. The method allows selections to be decoded and displayed independently of previously video stream selections. The method comprises the steps of: identifying (step 200) a digitally encoded set of signals (NP, TP1, -TP1, TP2, -TP2) in a storage medium (10) for each one of a plurality of video programs (P1, P2, P+n) for reproduction of each one of said plurality of programs at a plurality of reproduction speeds; reproducing one of the encoded signals (NP, TP1, -TP1, TP2, -TP2) from the store (10) responsive to a program selection and a reproduction speed; calculating an address (step 375) for initiating reproduction of a different one of the encoded signals (NP, TP1, -TP1, TP2, -TP2) responsive to a new reproduction speed; reproducing (step 600) the different one of the encoded signals (NP, -TP1, TP2, -TP2) from the address in the store (10); and, decoding the reproduced signals for display of the selected program at the selected new reproduction speed.

11 Claims, 4 Drawing Sheets

| STREAM | BIT-RATE (Mbps) | RESOLUTION |
|---|---|---|
| NORMAL PLAY | 4.00 Mbps | 704 x 480 |
| 7X FORWARD | 1.50 Mbps | 352 x 240 |
| 21X FORWARD | 1.50 Mbps | 352 x 240 |
| 7X REVERSE | 1.50 Mbps | 352 x 240 |
| 21X REVERSE | 1.50 Mbps | 352 x 240 |

TRICK-PLAY CONTROL FOR PRE-ENCODED VIDEO

This invention relates to digitally compressed video material and in particular to the provision this material at speeds other than at normal play speed.

The implementation of trick-play modes within digital video systems is a problem which is becoming more important as digital video-based systems enter the marketplace. Emerging consumer video products such as video on demand (VOD), video CDs, and other similar systems may compete with the VHS tape market as providers of feature-length movies. However, unlike analog-based replay methods, digital video systems represent a challenge in the reproduction of video images at speeds other than normal play speed. Such "off speed" reproductions being known as trick-play which may provide images at various speeds, for example, fast-forward, fast-reverse, freeze-frame etc.

Published European Patent application EP A 0625857 teaches the design of a video server for transmitting video signals to a plurality of user stations in response to commands therefrom. The reference is specifically directed to a server memory control means which is supplemented by a plurality of program control modules. EP A 0625857 teaches the use of a real time signal and special signals to facilitate visual fast forward or visual rewind operation. Memory allocation tables link the real time signal and special signals. In addition EP A 0625857 discloses link points in the linked signal to permit selection therebetween without program discontinuity.

SUMMARY OF THE INVENTION

An inventive arrangement for reproducing a video program advantageously determines replay addresses by calculation in real time responsive to user selection, thereby avoiding a requirement to pre-process or pre-form memory allocation tables with linking, as disclosed in EP A 0625857.

An inventive method for reproducing video programs, comprises the steps of:

identifying a digitally encoded set of signals in a storage medium for each one of a plurality of video programs for reproduction of each one of the plurality of programs at a plurality of reproduction speeds;

reproducing one of the encoded signals from the store responsive to a program selection and a reproduction speed;

responding to a new reproduction speed request by calculating to determine an address for initiating reproduction of a different one of the encoded signals corresponding to the new reproduction speed;

reproducing the different one of the encoded signals from the address in the store; and, decoding the reproduced signals for display of the selected program at the selected new reproduction speed.

An apparatus for reproducing video programs at a plurality of speeds and selecting therebetween responsive to a user command, comprises a storing means for storing a digitally encoded set of signals for each one of a plurality of video programs. A reproducing means reproduces one of the digitally encoded signals from a selected one of the sets in response to a program and speed selection for decoding and display. A calculating means for calculates an address to initiate reproduction of a signal from the selected set in response to a user selection of a different reproduction speed. One signal of each set of signals stored by the storing means, facilitates reproduction at a normal play speed and other signals of the set facilitate reproduction at other speeds. The normal play speed signal occupies a specific memory size within the storage means, and the other speed signals occupy memory sizes less than the specific memory size.

Figures 1, 2:
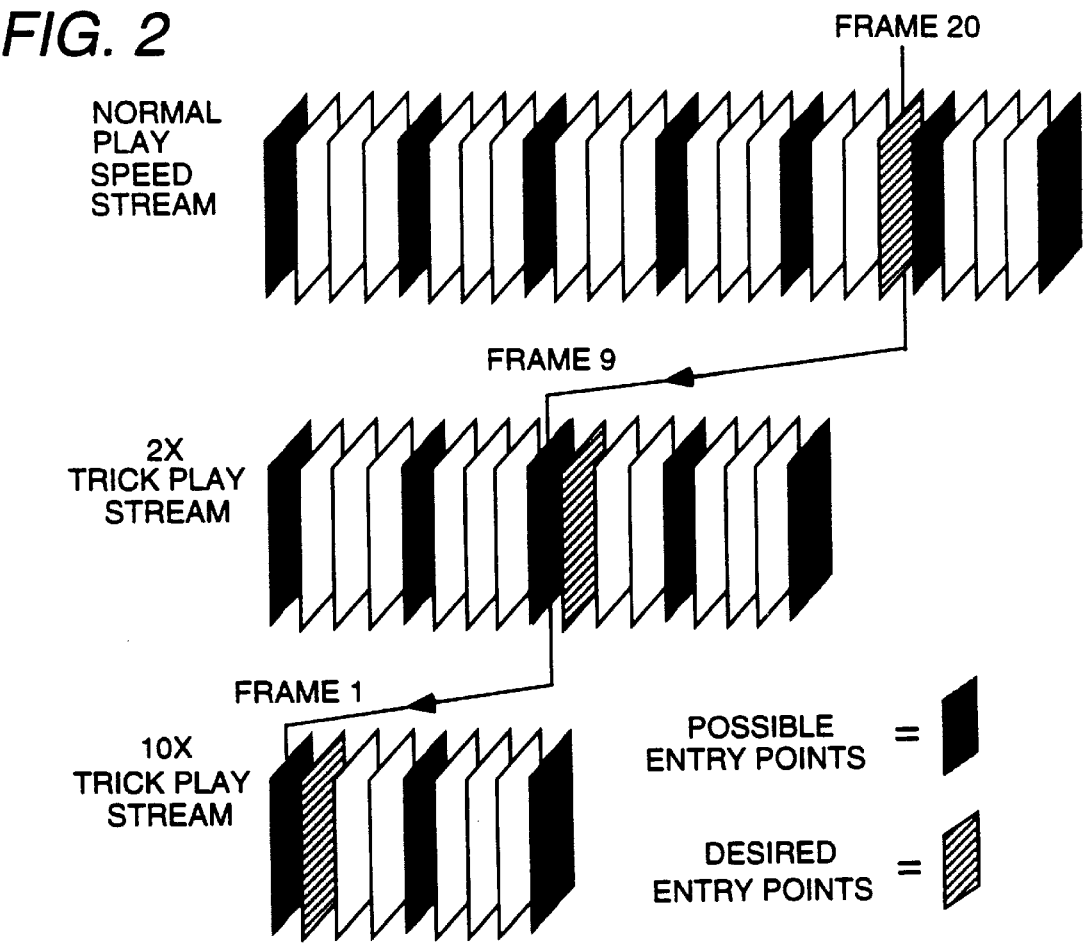
FIG. 1 shows table 1 which indicates advantageous bit rate and resolution differences for both normal and trick-play modes.
FIG. 2 illustrates compressed video data streams representing normal play speed, twice play speed and ten times play speed.

This inventive method facilitates various trick-play modes by controlled selection of "replay" locations. Depending on the program storage medium a single stream may provide normal play speed and trick-play operation. However, the provision of both normal play speed and trick-play operation from a single program stream may result in trick-play speeds limited by the GOP size or I frame repetition rate. To provide a greater selection of trick-play speeds multiple program streams may be used with a single stream for normal play speed operation with other streams providing a variety of fast-forward and fast-reverse trick-play modes. The image streams which provide the trick-play feature may not necessarily be encoded at the same bit-rate, and may not necessarily have the same resolution as the original image stream. The use of a significantly lower bit-rate and/or resolution for encoding trick-play image streams may offer savings benefits when storage space and/or transmission costs are considered. In addition, human visual perception may also allow these trick-play image streams to be processed further to reduce resolution, and hence storage and transmission costs during trick-play video operation, without compromising perceived image quality.

As mentioned this method may be applied to various forms of video material, analog or digital and encoded in a variety of ways. However, in this description of an exemplary system, it is assumed that trick-play streams are encoded in an MPEG format with the following parameters:

there is one normal-play (normal speed) MPEG video stream, two fast-forward streams are required, 7× & 21× normal speed, two fast-reverse streams are required, minus 7× & 21× normal speed.

However, this method may be applied equally effectively to a variety of other speed configurations.

In the exemplary system, five separate MPEG-encoded streams are required. These streams are completely independent and may be of varying bit-rates and/or varying display resolutions. For example, one possible trade-off between quality and memory efficiency is illustrated in table 1 shown in FIG. 1. Table 1 shows trick-play streams employing lower resolution, 352×240 pixels and a lower bit-rate, 1.5 Mbps than the normal-play stream, 704×480 at 4.0 Mbps. This trade-off is fully acceptable since high spatial picture quality may result in trick-play resolution beyond human visual perception. Hence the trade-off in resolution and bit rate results in more efficient storage utilization. The extra memory capacity required to store all forward and reverse trick-play streams may be calculated by summing each trick-play bit-rate divided by the trick-play speed for each trick-play speed and expressing as a percentage of the normal play speed bit-rate.

$$\text{Extra storage required as percentage} = \frac{2[1.5/7] + 2[1.5/21]}{4} \times 100\%$$

extra storage required=14.37% Thus four trick-play data streams may be accommodated with approximately 15% extra storage capacity. A reverse normal play feature may be provided, which may appear to increase trick-play storage capacity requirements by 100%. However, such a reverse normal play feature may be facilitated with, for example, bit rate and resolution reductions. Thus the reverse normal play feature may require approximately 37% extra storage capacity, which when added to the other trick-play streams represents a storage capacity increase of about 50% of the normal play stream requirement.

As video material is read or replayed from the video server to the user's decoder, the server may be switched between the various streams in response to user instructions. For example, the user may select, via a remote control command, the highest fast-forward speed to rapidly locate a particular point in the material. The fast-forward control command results in the server readout address jumping, from the current location in the normal-play stream to the corresponding appropriate point within the 21× fast-forward stream and continue playing. Each trick-play and normal-play streams should comprise relatively uniform, short group of pictures (GOP) having a size of, for example, half a second. This GOP size yields a worst case visual continuity error of 0.25 seconds, i.e. time to reach the nearest I frame entry point when switching between bit streams.

An important part of the overall system is the method for determining switching entry points between the different image streams. For example, during "playback" of one stream a user may wish to switch to another stream. This switch requires calculation of the exact location in the new stream, to a byte accurate level, that the decoder should begin to "play" from. The determination of the "entry point" in the new stream may be derived as follows:

1. Determine the current byte offset, and hence the current frame in the current file.
2. Determine the new frame to switch to in the new file.
3. Determine the byte offset in the new file.

Step 2 is complicated by the fact that, for MPEG streams, the entry points into a new stream are limited to those points where a sequence_header exists, which is typically at an I frame at the beginning of a group of pictures (GOP). It is further complicated by the fact that the duration of the real display time of a GOP is not always constant even if the number of pictures in a GOP is constant. This complication arises from the possibility to repeat fields (or frames) in an MPEG sequence, with the result that more final 'displayed' frames can be produced by a single GOP than there are coded 'pictures' within the GOP.

An example of stream switching is illustrated in FIG. 2. In FIG. 2, the normal speed image stream is being read or "played" from a storage medium, and two trick-play image streams are available on the medium for reproduction at 2× and 10× normal speed. The trick-play speeds of 2 and 10 times are selected for illustration simplicity. At the instant of user trick-play selection or switching time, the normal play image stream is at frame number 20. Possible entry points into each of the three streams are determined by sequence headers which are depicted by darkened frames in FIG. 2, and typically begin a group of pictures (GOP). The "best fit" frames which can be switched to are pointed to by the arrow head line which links the entry points in the various video streams. The "ideal" or desired entry points, in terms of the users visual continuity, are indicated in FIG. 2 by horizontally shaded frames. Note that these "ideal" points are not necessarily calculated simply from (current frame in normal sequence)/(trick-play stream speed) due to the complications of displayed and repeated frames described above. In each case, the actual frame selected is a "best fit" possible entry frame which is closest in time to the users desired or "ideal" frame. From the illustration in FIG. 2, the decision of which frame to switch to may appear to be obvious. However, from an algorithmic point of view this is far from trivial. An important part of the overall system is the method of determining the switching points between the different streams. To accomplish this function, look-up tables, or LUTs may be employed which list the file byte offsets for each GOP in each play speed stream. These look-up tables may be pre-recorded on the program storage medium.

Figure 3:
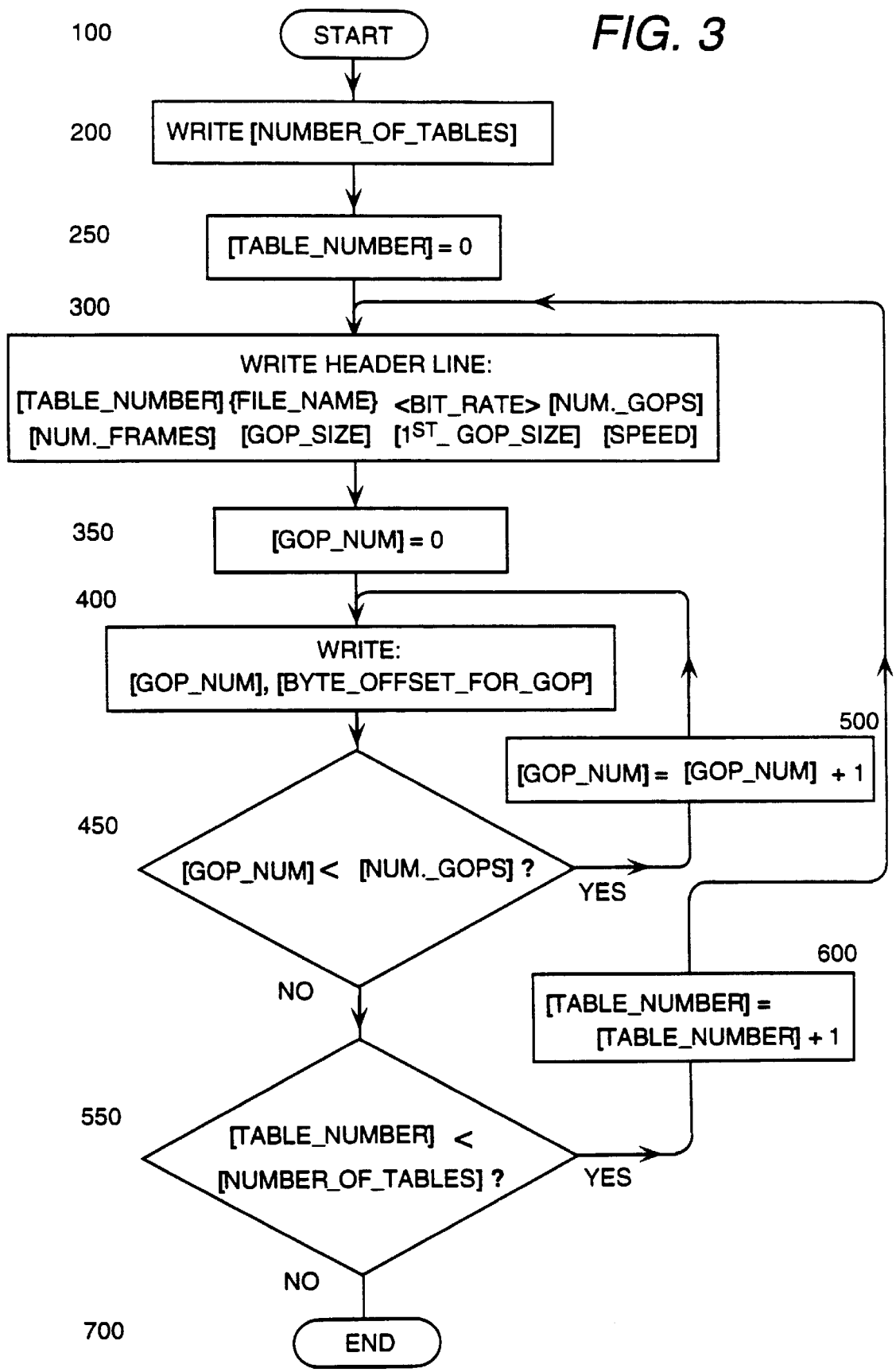
FIG. 3 is a flow chart illustrating the formulation of table groups for use in an inventive method for selecting between bit streams representing normal and trick-play reproduction speeds.

The look-up table may be constructed as depicted in the exemplary flow chart of FIG. 3. Look-up table construction is initiated at step 100 and at step 200 the number of tables is written. The number of look-up tables is the same as the number of bit streams. In exemplary FIG. 1 there are 5 streams thus [number_of_tables] is 5. At step 300 a header line is written which comprises various parameters, some required for table formulation others for subsequent decoder conditioning. At step 350 the [GOP_number] is set equal to zero. The table entries start at step 400 which writes the [GOP_number] and its corresponding [BYTE_OFFSET]. A test is performed at step 450 to determine if the [GOP_number] is less than the [num_gops], i.e. is the table incomplete? A YES at step 450 initiates a loop which writes successive GOP numbers with corresponding byte entries. The YES from step 450 causes the [GOP_number] to be incremented by one, at step 500, and be looped back to step 400. Thus TABLE 0 is constructed by multiple loops of steps 400, 450 and 500 until the [GOP_number] equals the [num_gops] which results in a NO at step 450.

The NO at step 450 signifies a completed table and results in a further test, at step 550, which tests for incompletion of the total number tables. A YES at step 550 causes the table number to be incremented by one, at step 600, and then returns to step 300 to initiate construction of the second table by means of the steps described above. When step 550 tests NO the sets of tables are complete. An exemplary look up table constructed by the method of FIG. 3 is shown below in TABLE 2.

TABLE 2

[number_of_tables]
[Table_number] {file_name} <bit_rate Mbps> [num_gops]
[num_frames] [gop_size] [1st_gop_size] [speed]
[gop number] [file byte offset]
[gop number] [file byte offset]
[gop number] [file byte offset]

TABLE 2-continued

. Repeated [num_gops] times
.
[gop number] [file byte offset]
[gop number] [file byte offset]
[gop number] [file byte offset]
.
. Repeat all of above (except first line) [number_of_tables] times
.

TABLE 2 Parameter Definitions:
[ ] denotes an integer value,
< > denotes a floating point value,
{ } denotes a text string,

[number_of_tables]
The number of look-up tables in the file is the same as the number of bit streams. In exemplary FIG. 1 there are 5 streams thus [number_of_tables] is 5.

[Table_number]
Is a number which is associated with the ordering of the streams. This number must be between 0 and [number_of_tables] −1. [Table_number] also shows the order of the streams from fastest reverse to fastest forward.

{file_name}
The name of the muxed MPEG stream.

<bit_rate>
The rate in Mbits/second of the muxed MPEG stream including transport layer overhead.

[num_gops]
The number of GOPs in the video stream.

[num_frames]
The total number of frames in the MPEG video stream.

[gop_size]
The GOP size in displayed frames taking into account 3/2 pull down if necessary.

[1st_gop_size]
The size in displayed frames of the first GOP. Usually this will be [gop_size]−M+1. Where M is the distance between I and P frames in an MPEG stream

[speed]
Speed of the trick-play stream including sign.

The exemplary look-up-table, LUT of Table 2 may be stored in the system memory during playback of the video material. When the user changes from one speed to another, the information in the LUT is used to locate the correct, or corresponding point, in the new stream at which to start decoding. The information in the LUT is needed for this purpose and is employed together with the current offset, in bytes in the current bit-stream being played.

To initiate switching between streams the current GOP is determined from the current file offset by searching through the current play speed look-up table to find the GOP start point which corresponds to the current file offset (see Table 2). Once the current GOP is known, the new GOP, gop_new, may be calculated from the old GOP, gop_old, using equations 1 and 2, and the following parameters, speed_new, speed_old, gop_size and first_gop_size;

$$\text{gop\_new} = [(\text{old\_frame}*\text{old\_speed}/\text{new\_speed}) + (\text{gop\_size} - \text{first\_gop\_size})] / \text{gop\_size} \quad \text{Equation 1.}$$

where, $$\text{old\_frame} = \text{gop\_old}*\text{gop\_size} - (\text{gop\_size} - \text{first\_gop\_size}) \quad \text{Equation 2.}$$

Having calculated the new GOP, the look-up table appropriate to the new speed is searched to find the file offset which corresponds to the new GOP. The new stream may then be played starting at this new offset point. The relative simplicity of this system results in efficient switching between different streams. However, this method is based on real time calculation of the new GOP with the assumption that the streams contain GOPs which produce constant numbers of displayed frames (denoted by gop_size).

The use of these generic look-up tables containing the byte offset address for each GOP requires comparatively simple software control. Hence, user controls may be advantageously provided to facilitate fine tuning or modification of the stream switching delay independently from the actual switching control software. For example, a user may, in the interest of continuity of entertainment, opt to always join the new image stream ½ or 1 second prior to the departure point in the first stream, in this way "program" image continuity may be sustained. In addition such an "off set" entry point may advantageously compensate for user reaction time.

In addition the user may be provided with the ability to determine the accuracy, resolution or granularity of the look-up tables. For example, since a GOP address occurs at each I frame, clearly the highest resolution is obtained when every I frame in each stream is included in the LUT. This level of resolution maximizes the look-up table memory requirements. However, fewer I frame addresses in the LUT will reduce memory requirements but may introduce user frustration even if the jump to address is automatically corrected to include otherwise lost program images.

In addition, all control and fine tuning of the switching procedure (accuracy, timing, etc.) can be controlled by an overlay software which alters of modifies the values and number of entries read from the tables themselves without requiring access to the control software.

Figure 4:
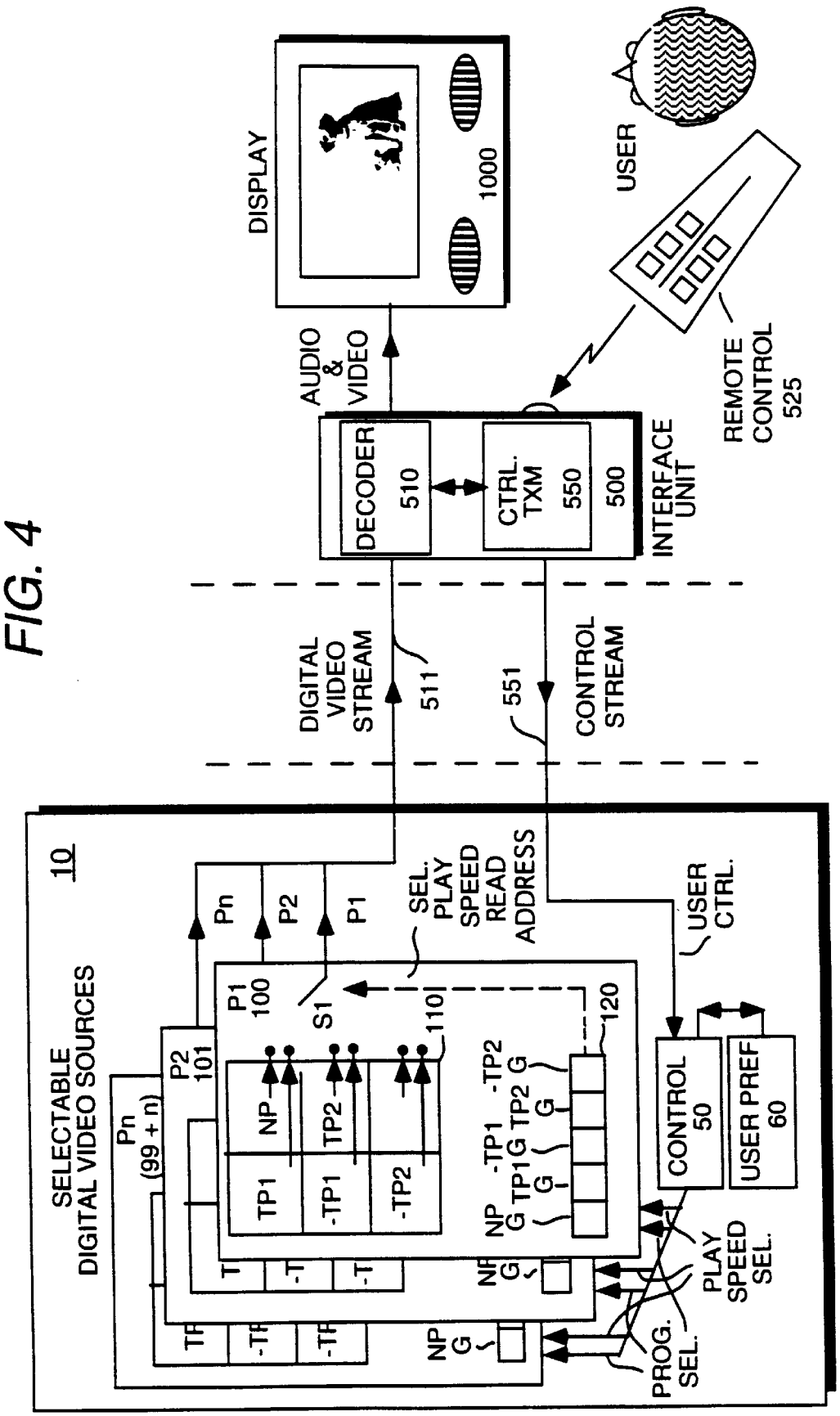
FIG. 4 is a block diagram illustrating a system employing inventive features for selection and control of compressed digital video sources.

A system employing the various inventive digital video source selection methods is depicted in FIG. 4. The system shown in FIG. 4 includes a user with, for example, a remote control capability provided by device 525, and a display device 1000 for monitoring audio and video input signals. An interface unit 500, provides a control communication stream 551 between the user's apparatus and a digital video source 10. Interface unit 500 also decodes a compressed digital video signal 511, derived from source 10 to produce audio and video signals which are coupled to display device 1000. The control stream 551 is generated by a control transmitter 550 which forms part of interface unit 500. The control stream carries a plurality of control functions, for example, activation of user billing, user interactively such as program source selection, "trick-play" features or provision of a "virtual VCR" like program source. The user may communicate with interface unit 500, via a remote control unit 525, or via manually activate switches (not shown).

Digital video source 10 comprises a control unit 50 which receives control stream 551 and implements user requested tasks via a software control program. For example, user originated commands may include, per use billing, program selection, pay per view premium program selection, program manipulation or "trick-play" features. User control preferences, as previously described, may be facilitated by user preference control software depicted in block 60 which interacts with the main control software of block 50.

Multiple compressed digital video program sources are stored in a storage device within source 10. The storage device may comprise a solid state memory, magnetic or optical memories or a combination of solid state and magnetic or optical. For exemplary purposes only, the compressed digital video programs depicted in FIG. 4, are shown as areas, or pages of memory with program P1 located on memory page 100, program P2 on page P101 and program Pn on page (99+n). Each program page, comprises a program memory space 110, which contains the compressed program for "reproduction" at normal play speed, for example, block NP for normal play. This normal play program may be represented by the bit rate and resolution parameters shown in table 1, FIG. 1. The program memory space 110, also contains various "trick-play" processed forms of the program, for example, TP1, "trick-play" speed 1 and its reverse, and TP2, "trick-play" speed 2 and its reverse. As described earlier, these "trick-play" versions of the program may be advantageously processed to reduce, or minimize, their memory requirements. For example, as described previously, the provision of four "trick-play" speeds represents and additional memory requirement of about 15%. To permit switching between program play speeds, each program page also contains inventive look up tables 120, which list from-to entry addresses as previously described.

Figure 5:
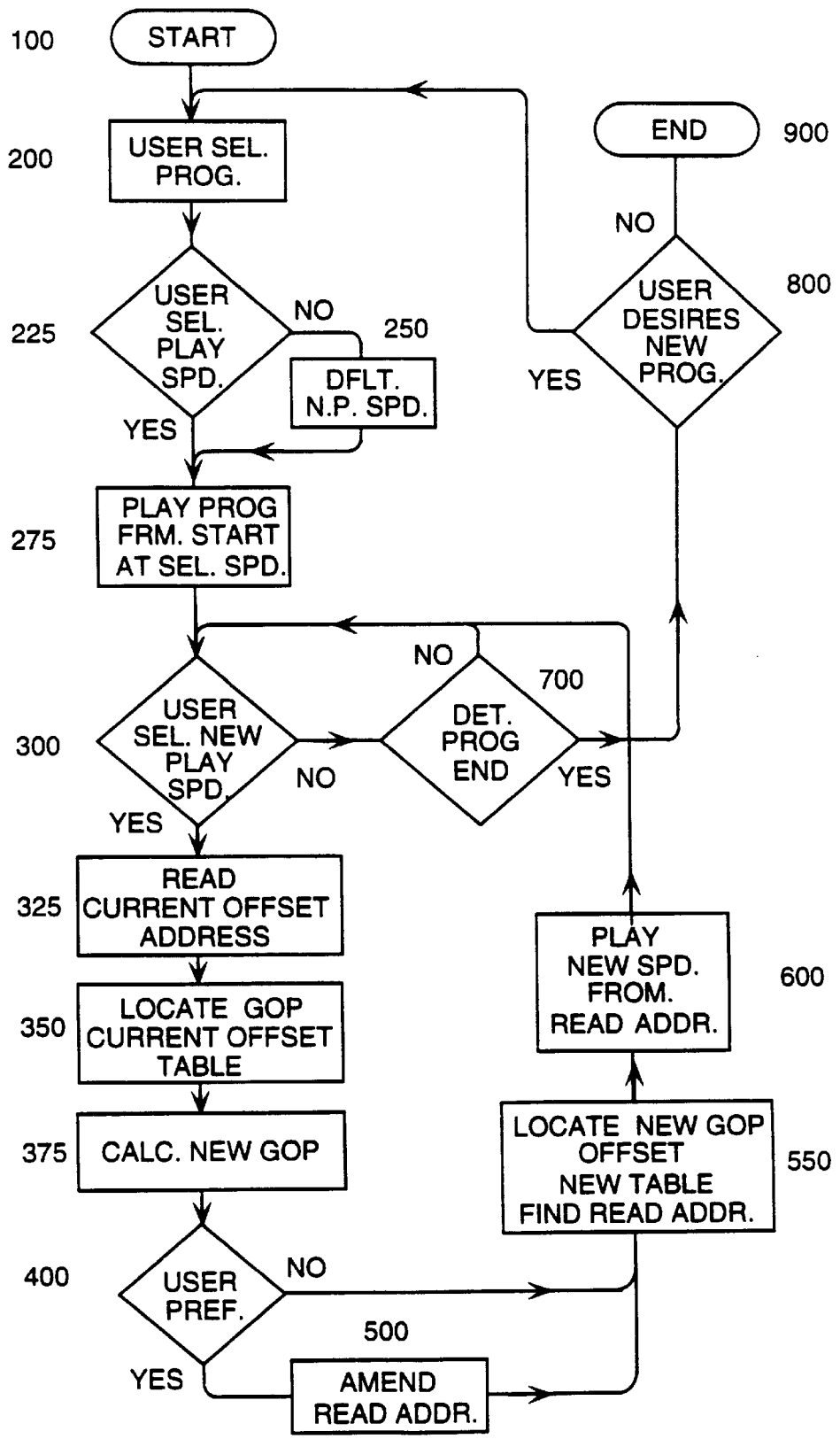
FIG. 5 is a flow chart illustrating operation of an inventive method of selection and control of compressed image streams for reproduction at normal and trick-play speeds.

Operation of the exemplary system shown in FIG. 4 may be explained with reference to the chart shown in FIG. 5. The user initiates contact with the digital video program source 10 by means of the remote control stream 551. This initial contact, or log-on may signal the start a billing period or event, or otherwise log user interaction with the system and is depicted in FIG. 5 as step 100, START. At log on the user may be presented with a program selection menu from which program selection is made. Control 50 of FIG. 4 receives the user command and selects, for example, Program 1 on memory page 100. This program selection is depicted at step 200 of FIG. 5. Having selected a program, information regarding the program is read from the storage medium and stored in the system memory of source 10. This information may include system data, for example, number of trick-play speeds, look-up tables, and various user choices, for example, display aspect ratio, language, rating etc. A test is performed at step 225 to determine if the user selected a play speed. If the user selected a normal play speed or NP mode, step 225 tests YES and the compressed digital program stream is read from the NP memory area of memory 110, as depicted by step 275 of FIG. 5. Similarly, the user may have selected to view Program 1 in the reverse direction at the highest play speed, thus step 225 tests YES and a version of Program 1 is read from, for example, −TP2 memory area of memory 110. If the user failed to specify play speed, a default setting at step 250 is invoked which automatically selects normal play speed reproduction of the selected program, at step 275 of FIG. 5.

Having commenced reproduction of Program 1 a test is performed at step 300 to determine if a new play speed has been selected by the user. A NO at step 300 is tested further to detect the program end at step 700. Thus, a NO at both steps 300 and 700 forms a loop which waits for either a play speed change command or the program end. If test 300 is YES a new play speed has been selected and the control system 50 of FIG. 4 determines the byte offset address in the current program replay as depicted at step 325 of FIG. 5. A look up table, specific to the current play speed contains the byte offset values or addresses for each GOP in current play speed stream. This current look up table is searched at step 350 of FIG. 5, to find the current GOP which corresponds to the current byte offset value. Thus, having found the current GOP, step 375 calculates the new GOP using equations 1 and 2, as described earlier.

A test is performed at step 400 to determine if the user has selected preferences for jump-to location and or jump-to address granularity. The actual jump to address in the new speed stream may be modified by user preferences 60, and may advantageously result in the joining the new program at a point which precedes the departure point of the old, or previously program. A NO at step 400 enables the determination of the new replay or jump-to address from the new speed look-up table of step 550. If step 400 tests YES the user preferences are applied to modify the jump-to address generated by step 550. For example the user may prefer to join the new speed program one or two seconds prior to his speed change selection point. Thus step 500 amends the jump-to address derived from the look up tables of step 550. The advantageously amended jump-to address determines the start point for replay of the new speed program as indicated at step 600.

A look up table specific to the new play speed is searched, at step 550, to locate the byte offset value, or read address, which corresponds with the calculated new GOP. This byte offset value is the jump-to address in the new speed stream from which reproduction will be initiated to ensure that the new program version may be decoded independently of adjacent or preceding frames. Thus the user's program continuity is maintained by avoiding displayed image anomalies, such as freeze frames, blue screens, etc.

Following initiation of the new speed program replay at step 600, the control sequence loops back to steps 300 and 700 and waits for either a further play speed request or the end of the program. If at step 700 tests YES, signifying the program end is reached, a further test is performed at step 800 which determines if the user desires a new program. A YES at step 800 is coupled back to step 200 where the user may select another program from the program selection menu. A NO at step 800 indicates that the replay session is ended and interaction with source 10 is terminated at the END step 900.

In FIG. 4, an exemplary switch S1 is depicted in memory page 100, for the purpose of illustration only, in actuality the program stream is read from the appropriate play speed memory, i.e. NP, TP2 etc., starting at an address defined by the appropriate address pair from the specific look up table of memory 120, associated with transitions from the current speed to the new speed. Similarly the user may transition from any current play stream to any other play stream by means of tables 120 which list all possible entry points for each play speed.

Source 10 of FIG. 4 may be implemented as a consumer entertainment unit containing multiple programs. For example, a video juke box with an a program disk library and changer mechanism. Source 10 may comprise a combination of disk based programs coupled to an electronic buffer memory. The program disk may be MPEG encoded and in addition contain applicants' advantageous look up tables. These look up tables may contain I frame track addresses which enable the disk replay transducer to jump successively between I frames in order to generate the desired "trick-play" reproduction speed. The storage requirements of these look up tables is small, as has been discussed. However these tables must be recovered from the disk and be stored in an active memory prior to program replay in order to facilitate "trick-play" reproduction. During "trick-play" reproduction the disk replay transducer jumps successively between I frames in a sequence derived from the jump-to tables. For example, at seven times forward speed the transducer is directed to jump "over" seven intervening I frames and reproduce only the eighth I frame. This play jump play sequence is repeated continuously until the program end is reached or the user makes a further selection. Gaps in the reproduced signal stream may be concealed by the use of a buffer memory and image repeat rationales. The program disk may contain "trick-play" specific MPEG streams, temporally and spatially processed to facilitate smoother visual presentation than obtainable with I frame only reproduction. Similarly these "trick-play" specific streams may be the addressable by applicants' advantageous look up tables.

Source 10 may represent portable entertainment unit preloaded with a selection of compressed video programs or motion pictures for consumer use within a household. This entertainment unit may be scaled up and centrally located to provide multiple user access to the compressed program content. This centralized replay facility requires bi-directional communication with the user in order to facilitate a virtual VCR with "trick-play" features described.

We claim:

1. A method for reproducing video programs, comprising the steps of:

identifying a digitally encoded set of signals in a storage medium for each one of a plurality of video programs for reproduction of each one of said plurality of programs at a plurality of reproduction speeds;

reproducing one of said encoded signals from said store responsive to a program selection and a reproduction speed;

responding to a new reproduction speed request by calculating an address for initiating reproduction of a different one of said encoded signals corresponding to said new reproduction speed;

modifying said new reproduction speed request according to a user preference that offsets said address for initiating said reproduction of said different one of said encoded signals;

reproducing said different one of said encoded signals from said address in said store; and, decoding said reproduced signals for display of said selected program at said selected new reproduction speed, whereby said reproducing of said different one of said encoded signals can be initiated at a different time during playback with respect to said address determined by said calculating step prior to said modifying step.

2. The method of claim 1, comprising the step of offsetting said address to initiate said reproduction of said different one of said encoded signals at an earlier time during playback with respect to said address determined by said calculating step prior to said modifying step.

3. The method of claim 2, further comprising the step of offsetting said address by an amount sufficient to jump back by at least a predetermined time interval.

4. The method of claim 3, further comprising the step of initiating said earlier playback at the next available maximum resolution frame in said different one of said encoded signals.

5. The method of claim 1, comprising the step of jumping back to an earlier time during playback with respect to said address determined by said calculating step prior to said modifying step.

6. The method of claim 5, further comprising the step of offsetting said address by an amount sufficient to jump back by at least a predetermined time interval.

7. The method of claim 6, further comprising the step of initiating said earlier playback at the next available maximum resolution frame in said different one of said encoded signals.

8. An apparatus for reproducing video programs at a plurality of speeds and selecting therebetween responsive to a user command, said apparatus comprising:

means for storing a digitally encoded set of signals for each one of a plurality of video programs;

means for reproducing one of said digitally encoded signals from a selected one of said sets responsive to a program selection and a reproduction speed selection for decoding and display;

means for calculating an address to initiate reproduction of a signal from said selected set responsive to a user selection of a different reproduction speed; and, means for modifying operation of said calculating means according to a user preference that offsets said address for initiating said reproduction of said signal from said selected set, whereby said signal from said selected set can be joined at a different time during playback with respect to said address determined by said calculating means.

9. The method of claim 8, wherein said address is offset to initiate said reproduction of said different one of said encoded signals at an earlier time during playback with respect to said address determined by said calculating means.

10. The method of claim 9, wherein said address is offset by an amount sufficient to jump back by at least a predetermined time interval.

11. The method of claim 10, wherein said playback is joined at the next available maximum resolution frame in said signal.

* * * * *